(12) United States Patent
Hayashi et al.

(10) Patent No.: US 10,107,218 B2
(45) Date of Patent: Oct. 23, 2018

(54) CONTROL APPARATUS FOR SPARK-IGNITION INTERNAL COMBUSTION ENGINE

(71) Applicant: TOYOTA JIDOSHA KABUSHIKI KAISHA, Toyota-shi (JP)

(72) Inventors: Keisuke Hayashi, Toyota (JP); Masahiro Ozeki, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/988,785

(22) Filed: Jan. 6, 2016

(65) Prior Publication Data

US 2016/0208720 A1  Jul. 21, 2016

(30) Foreign Application Priority Data

Jan. 21, 2015 (JP) ................. 2015-009340

(51) Int. Cl.
*F01N 3/00* (2006.01)
*F01N 3/10* (2006.01)
(Continued)

(52) U.S. Cl.
CPC ..... *F02D 41/0255* (2013.01); *F02D 19/0655* (2013.01); *F02D 37/02* (2013.01);
(Continued)

(58) Field of Classification Search
CPC ............. F02D 19/0655; F02D 41/0002; F02D 41/0025; F02D 41/0255; F02D 41/08;
(Continued)

(56) References Cited

U.S. PATENT DOCUMENTS 4,391,253 A * 7/1983 Ito ................. F02D 41/2454
123/406.44
2009/0205613 A1* 8/2009 Kawakita ............ F02D 37/02
123/406.44
(Continued)

FOREIGN PATENT DOCUMENTS

JP  2008-157142     7/2008
JP  2008274789  *  7/2008
(Continued)

*Primary Examiner* — Phutthiwat Wongwian
*Assistant Examiner* — Diem Tran
(74) *Attorney, Agent, or Firm* — Oblon, McClelland, Maier & Neustadt, L.L.P.

(57) ABSTRACT

When a catalyst of an internal combustion engine is not activated, a control apparatus retards the ignition timing of a spark plug, and thereby, executes a rapid warm-up control of the catalyst. However, on this occasion, when alcohol concentration Ca is high, the control apparatus sets the ignition timing to a more advanced side than when the alcohol concentration Ca is low. When the ignition timing is set to an advanced side, opening angle θ of a throttle valve is manipulated such that command value qsjc for the quantity of the air that is filled into a combustion chamber is increased. Thereby, compared with when the command value qsjc is not increased, the quantity of the fuel that is injected from a cylinder injection valve increases, and the thermal energy of exhaust gas increases.

5 Claims, 3 Drawing Sheets (51) Int. Cl.
- *F02D 41/02* (2006.01)
- *F02P 5/04* (2006.01)
- *F02D 41/00* (2006.01)
- *F02D 37/02* (2006.01)
- *F02D 41/32* (2006.01)
- *F02D 41/34* (2006.01)
- *F02D 19/06* (2006.01)
- *F02P 5/15* (2006.01)
- *F02D 41/08* (2006.01)

(52) U.S. Cl.
CPC ..... *F02D 41/0002* (2013.01); *F02D 41/0025* (2013.01); *F02D 41/32* (2013.01); *F02D 41/345* (2013.01); *F02P 5/045* (2013.01); *F02P 5/1504* (2013.01); *F02D 41/08* (2013.01); *F02D 2200/0611* (2013.01); *Y02T 10/26* (2013.01); *Y02T 10/36* (2013.01); *Y02T 10/42* (2013.01); *Y02T 10/44* (2013.01); *Y02T 10/46* (2013.01)

(58) Field of Classification Search
CPC ............ F02D 41/32; F02D 41/345; F02D 2200/0611; F02D 37/02; F02P 5/045; F02P 5/1504; Y02T 10/26; Y02T 10/42; Y02T 10/44

USPC .......................................... 60/284, 285, 299
See application file for complete search history.

(56) References Cited

U.S. PATENT DOCUMENTS

| | | | |
|---|---|---|---|
| 2010/0145596 A1* | 6/2010 | Nishimura | F02D 19/0628 701/103 |
| 2010/0312459 A1* | 12/2010 | Utsumi | F02D 15/02 701/106 |
| 2012/0031374 A1* | 2/2012 | Hokuto | F02D 35/027 123/445 |
| 2012/0111301 A1 | 5/2012 | Basaki et al. | |
| 2013/0046451 A1* | 2/2013 | Suzuki | F02D 35/023 701/102 |

FOREIGN PATENT DOCUMENTS

| | | | |
|---|---|---|---|
| JP | 2008-196318 A | | 8/2008 |
| JP | 2008-274789 | | 11/2008 |
| JP | 2009-47055 A | | 3/2009 |
| JP | 2011-001881 | * | 1/2011 |
| JP | 2012-102627 | | 5/2012 |

* cited by examiner

CONTROL APPARATUS FOR SPARK-IGNITION INTERNAL COMBUSTION ENGINE

INCORPORATION BY REFERENCE

The disclosure of Japanese Patent Application No. 2015-009340 filed on Jan. 21, 2015 including the specification, drawings and abstract is incorporated herein by reference in its entirety.

BACKGROUND OF THE INVENTION

1. Field of the Invention

The invention relates to a control apparatus for a spark-ignition internal combustion engine to control a spark-ignition internal combustion engine including a fuel injection valve that injects fuel to be fed into a cylinder, a catalyst that is provided in an exhaust passage, and a spark plug.

2. Description of Related Art

The retard of ignition timing is well known, as a warm-up control of a catalyst that is provided in an exhaust system of a spark-ignition internal combustion engine. Further, Japanese Patent Application Publication No. 2008-274789 proposes that the retard quantity for the ignition timing by the warm-up control of the catalyst is decreased in the case where the alcohol concentration of the fuel to be fed into a cylinder is high ([0010]). This is intended to inhibit a situation in which the combustion becomes unstable in the case where the alcohol concentration is high.

SUMMARY OF THE INVENTION

However, when the retard quantity for the ignition timing by the warm-up control of the catalyst is decreased in the case where the alcohol concentration of the fuel is high, the warm-up performance for the catalyst degrades because the ignition timing is advanced. Therefore, the combustion stability and the warm-up performance for the catalyst are difficult to be compatible.

The invention provides a control apparatus for a spark-ignition internal combustion engine that can achieve a good compatibility between the combustion stability and the warm-up performance for the catalyst.

Hereinafter, means for solving the above problem and function effects of the means will be described. 1. A control apparatus for a spark-ignition internal combustion engine includes: a fuel injection valve that injects fuel to be fed into a cylinder; a catalyst that is provided in an exhaust passage; an acquisition processing unit that controls a spark-ignition internal combustion engine including a spark plug and that acquires alcohol concentration of the fuel to be injected from the fuel injection valve; and a warm-up control unit that executes a warm-up control of the catalyst by manipulating ignition timing of the spark plug, with the condition that the catalyst is not activated, and the warm-up control unit includes: an ignition advance processing unit that, in a case where the alcohol concentration is high, sets the ignition timing to an advanced side, compared with a case where the alcohol concentration is low; and an air quantity increase processing unit that, in a case where quantity of advance of the ignition timing set by the ignition advance processing unit is large, increases quantity of air that is filled into the cylinder, compared with a case where the quantity of the advance of the ignition timing is small. The invention can also be defined as follows. In a control apparatus for a spark-ignition internal combustion engine, the spark-ignition internal combustion engine includes: a fuel injection valve that injects fuel, the fuel being fed into a cylinder; a catalyst that is provided in an exhaust passage; and a spark plug, and the control apparatus includes an electronic control unit configured to: a) acquire alcohol concentration of the fuel that is injected from the fuel injection valve; b) execute a warm-up control of the catalyst by manipulating ignition timing of the spark plug, when the catalyst is not activated; and c) during the execution of the warm-up control, i) in a case where the alcohol concentration is high, set the ignition timing to an advanced side, compared with a case where the alcohol concentration is low, and ii) in a case where quantity of advance of the ignition timing is large, increase quantity of air that is filled into the cylinder, compared with a case where the quantity of the advance of the ignition timing is small.

The above warm-up control unit performs the warm-up control of the catalyst by manipulating the ignition timing of the spark plug, with the condition that the catalyst is not activated, but includes the ignition advance processing unit that, in the case where the alcohol concentration is high, advances the ignition timing relative to the case where the alcohol concentration is low, in order to inhibit an unstable combustion caused by a high alcohol concentration. In the case where the ignition timing is advanced, compared with the case where the ignition timing is not advanced, the ratio of the combustion energy of the fuel that contributes to the torque of a crankshaft of the internal combustion engine increases while the thermal energy of the exhaust gas to be exhausted to the exhaust passage decreases. Hence, in the above configuration, in the case where the quantity of the advance of the ignition timing is large, the air quantity increase processing unit increases the quantity of the air that is filled into the cylinder, compared with the case where the quantity of the advance of the ignition timing is small. When the quantity of the air is increased, the quantity of the exhaust gas to be exhausted to the exhaust passage increases, compared with the case where the quantity of the air is not increased. Therefore, the quantity of the exhaust gas to pass through the catalyst increases, and thereby, the thermal energy to be given to the catalyst by the exhaust gas increases. This means that the degradation in the warm-up performance for the catalyst, which is likely to occur due to the advance of the ignition timing, can be inhibited by the increase in the quantity of the air. Accordingly, in the above configuration, it is possible to achieve a good compatibility between the combustion stability and the warm-up performance for the catalyst.

2. The control apparatus for a spark-ignition internal combustion engine according to the above 1 includes an air-fuel ratio control unit to manipulate quantity of the fuel that is injected from the fuel injection valve, during the execution of the warm-up control, in order to control air-fuel ratio of air-fuel mixture in the cylinder to a target air-fuel ratio.

In the above configuration, in the case where the quantity of the air is increased by the air quantity increase processing unit, the air-fuel ratio control unit increases the quantity of the fuel that is injected from the fuel injection valve, in order to control the exhaust characteristic to a predetermined characteristic. Therefore, the quantity of the fuel that is combusted increases, and the combustion energy increases, so that the thermal energy in the exhaust gas increases. Accordingly, it is possible to increase the thermal energy that is given to the catalyst.

3. In the control apparatus for a spark-ignition internal combustion engine according to the above 2, the fuel injection valve includes a cylinder injection valve that directly injects the fuel into the cylinder, and the air-fuel ratio control unit manipulates the quantity of the fuel that is injected from the cylinder injection valve, in order to control the air-fuel ratio of the air-fuel mixture to the target air-fuel ratio, and includes an injection advance processing unit that, in the case where the alcohol concentration is high, advances injection start timing of the fuel of the cylinder injection valve, compared with the case where the alcohol concentration is low.

In the above configuration, in the case where the alcohol concentration is high, the air-fuel ratio control unit controls the exhaust characteristic to a predetermined characteristic, and thereby, the quantity of the fuel that is injected from the cylinder injection valve is increased, compared with the case where the alcohol concentration is low. Therefore, there is a fear that the stratification degree near the spark plug is reduced at the ignition timing. Hence, in the above configuration, in the case where the alcohol concentration is high, the injection start timing of the fuel of the cylinder injection valve is advanced, compared with the case where the alcohol concentration is low. Thereby, it is possible to inhibit the reduction in the stratification degree near the spark plug at the ignition timing.

4. In the control apparatus for a spark-ignition internal combustion engine according to the above 2 or 3, the fuel injection valve includes a cylinder injection valve that directly injects the fuel into the cylinder, and the air-fuel ratio control unit manipulates the quantity of the fuel that is injected from the cylinder injection valve, in order to control the air-fuel ratio of the air-fuel mixture to the target air-fuel ratio, and includes a pressure rise processing unit that raises pressure of the fuel that is injected from the cylinder injection valve, in a case where the alcohol concentration is a predetermined value or more.

In the above configuration, in the case where the alcohol concentration is high, the air-fuel ratio control unit controls the exhaust characteristic to a predetermined characteristic, and thereby, the quantity of the fuel that is injected from the cylinder injection valve is increased, compared with the case where the alcohol concentration is low. Then, when the quantity of the fuel that is injected from the cylinder injection valve is excessively increased, the quantity of the fuel that is injected when a piston of the internal combustion engine is positioned near the bottom dead center increases, and there is a fear that the quantity of the fuel to adhere to a cylinder wall surface increases. Then, when the quantity of the fuel to adhere to the cylinder wall surface increases, there is a fear that the fuel is incompletely combusted and the emission and the combustion state are deteriorated. In this regard, because of including the pressure rise processing unit, in the case where the injection quantity is increased, the above configuration shortens an injection period that is a period required for the injection of the increased injection quantity. Thereby, it is possible to decrease the quantity of the fuel that is injected when the piston is positioned near the bottom dead center. Therefore, it is possible to inhibit the adhesion of the fuel to the cylinder wall surface, and further to inhibit the deterioration in the emission and the combustion state.

Furthermore, when the pressure rise processing unit is included, it is possible to inhibit the deterioration in the combustion state in the case where the alcohol concentration is high, and therewith, for example, it is possible to make the combustion state better in the case where the alcohol concentration is low. That is, it is possible to meet some required elements such as a good combustion state, and further to set the injection pressure before the rise by the pressure rise processing unit, to a pressure that is appropriate particularly in the case where the alcohol concentration is low.

5. In the control apparatus for a spark-ignition internal combustion engine according to any one of the above 1 to 4, the ignition advance processing unit sets the ignition timing to a more advanced side continuously or stepwise in two or more steps, as the alcohol concentration is higher, and the air quantity increase processing unit increases the quantity of the air continuously or stepwise in two or more steps, as the ignition timing is set to a more advanced side.

In the above configuration, the ignition timing is set to a more advanced side continuously or stepwise in two or more steps, as the alcohol concentration is higher, and therefore, it is possible to set the ignition timing to a more proper value, compared with a configuration in which the ignition timing is advanced only in one step. Further, in the above configuration, the quantity of the air is increased continuously or stepwise in two or more steps as the ignition timing is set to a more advanced side, and therefore, it is possible to set the quantity of the air to a more proper quantity, compared with a configuration in which the quantity of the air is increased only in one step.

6. In the control apparatus for a spark-ignition internal combustion engine according to any one of the above 1 to 5, the spark-ignition internal combustion engine is mounted in a vehicle, and gives shaft torque to a driving wheel, and the warm-up control unit executes the warm-up control of the catalyst with the condition that the spark-ignition internal combustion engine is in idle operation.

In the above configuration, the warm-up control of the catalyst is executed with the condition that the spark-ignition internal combustion engine is in idle operation. In this case, during the warm-up control of the catalyst, the internal combustion engine does not need to generate shaft output in response to the manipulation of an accelerator that is mounted in the vehicle. Therefore, the execution of the process of the increase in the quantity of the air by the air quantity increase processing unit, and the like is not restricted by the manipulation of the accelerator.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of a control apparatus for a spark-ignition internal combustion engine will be described with reference to the drawings. In an intake passage 12 of a spark-ignition internal combustion engine 10 shown in FIG. 1, an electronically-controlled throttle valve 14 for varying the cross-section area of the flow passage is provided. In the intake passage 12, a port injection valve 16 to inject fuel to an intake port is provided downstream of the throttle valve 14. By the valve opening operation of an intake valve 18, the air in the intake passage 12 and the fuel injected from the port injection valve 16 are filled into a combustion chamber 24 that is formed by a cylinder 20 and a piston 22. The combustion chamber 24 faces an injection port of a cylinder injection valve 28, and the cylinder injection valve 28 can directly inject and feed the fuel to the combustion chamber 24. In the combustion chamber 24, a spark plug 30 protrudes. Then, by the spark ignition of the spark plug 30, the air-fuel mixture of the air and the fuel is ignited, and the air-fuel mixture is supplied for combustion. Some of the combustion energy of the air-fuel mixture is converted into the rotational energy of a crankshaft 32, through the piston 22. The crankshaft 32 can be mechanically linked to a driving wheel of a vehicle. In the embodiment, it is assumed that the vehicle is a vehicle in which dynamic power is given to the driving wheel only by the internal combustion engine 10.

Figure 1:
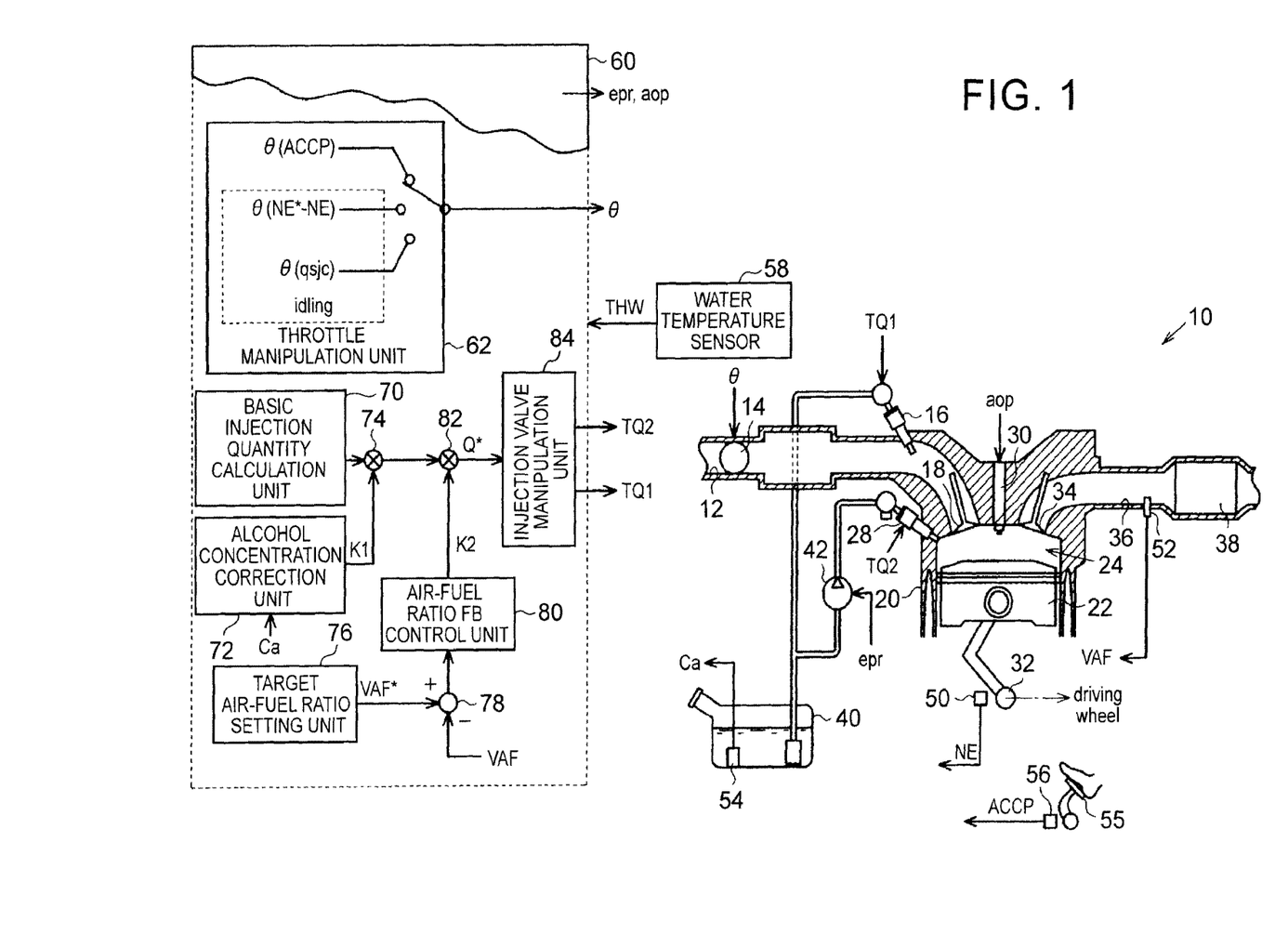
FIG. 1 is a system configuration diagram relevant to an embodiment of a control apparatus for a spark-ignition internal combustion engine.

By the valve opening operation of an exhaust valve 34, the air-fuel mixture supplied for combustion is exhausted to an exhaust passage 36, as exhaust gas. In the exhaust passage 36, a catalyst 38 for purifying the exhaust gas is provided.

The fuel to be fed to the port injection valve 16 and the cylinder injection valve 28 is stored in a fuel tank 40. In the embodiment, as the fuel, fuels including gasoline as the principal component with various contents of alcohol are assumed. Here, the fuel in the fuel tank 40 is pressurized by a high-pressure fuel pump 42, when being fed to the cylinder injection valve 28.

The above crankshaft 32 is provided with a crank angle sensor 50 to detect a signal corresponding to speed NE of the crankshaft 32. Further, on the upstream side of the catalyst 38, an air-fuel ratio sensor 52 to detect the air-fuel ratio of the air-fuel mixture in the combustion chamber 24 based on the components in the exhaust gas is provided. Output value VAF of the air-fuel ratio sensor 52 depends on the components in the exhaust mixture, and therefore, depends on the air-fuel ratio of the air-fuel mixture in the combustion chamber 24. Therefore, when the alcohol concentration in the fuel is identical, the output value VAF and air-fuel ratio A/F have a one-to-one correspondence ratio. However, when the alcohol concentration in the fuel differs, the value of the air-fuel ratio A/F itself differs even if the output value VAF is identical. This means that the value of the air-fuel ratio A/F itself differs even if the exhaust characteristic is identical.

The above fuel tank 40 is equipped with an alcohol concentration sensor 54 to detect the alcohol concentration in the stored fuel, and the alcohol concentration sensor 54 outputs a signal corresponding to detected alcohol concentration Ca.

Further, the vehicle is equipped with an accelerator pedal 55, and an accelerator sensor 56 is provided near an accelerator pedal 55. The accelerator sensor 56 detects and outputs a manipulated variable for the accelerator pedal 55 (accelerator manipulated variable ACCP).

Meanwhile, a water temperature sensor 58 detects and outputs the temperature (water temperature THW) of a coolant that flows through the cylinder 20. A control apparatus 60 is an electronic control unit (ECU) that controls the internal combustion engine 10. The control apparatus 60, for controlling controlled variables for the internal combustion engine 10, manipulates various actuators such as the throttle valve 14, the port injection valve 16, the cylinder injection valve 28, the spark plug 30 and the high-pressure fuel pump 42. Here, electric signals to be output to the various actuators by the control apparatus 60 are not always manipulated variables for the various actuators, and are electric signals for manipulating the manipulated variables. However, for a simple explanation, the figure does not discriminate between electric signals and manipulated variables. That is, for example, an electric signal to be output to the high-pressure fuel pump 42 is described as the pressure (injection pressure epr) of the fuel to be regulated by the high-pressure fuel pump 42, and an electric signal to be output to the spark plug 30 is described as an ignition timing aop of the spark plug 30.

FIG. 1 shows, as a block diagram, some of the processes that are executed by the control apparatus 60. That is, a throttle manipulation unit 62 manipulates opening angle θ of the throttle valve 14. In detail, in the case where it is requested to give the shaft torque of the internal combustion engine 10 to the driving wheel by the pressing of the accelerator pedal 55, the throttle manipulation unit 62 manipulates the opening angle θ depending on the accelerator manipulated variable ACCP. On the other hand, in the case of an idle operation in which the accelerator pedal 55 is released and it is not requested to give the shaft torque of the internal combustion engine 10 to the driving wheel, the throttle manipulation unit 62 basically manipulates the opening angle θ, for the feedback control of the speed NE of the crankshaft 32 to a target speed NE*. However, in the embodiment, even at the time of the idle operation, the opening angle θ is set to a command value qsjc for the quantity of the air that is filled into the cylinder (into the combustion chamber 24), in the case where a rapid warm-up control of the catalyst 38 described later in detail is executed.

Meanwhile, a basic injection quantity calculation unit 70 calculates a basic injection quantity that is a basic value for the total quantity of the fuel to be injected from the port injection valve 16 and the cylinder injection valve 28, based on a parameter relevant to the load on the vehicle. Here, in the above rapid catalyst warm-up control, the basic injection quantity is set based on the command value qsjc for the air quantity.

An alcohol concentration correction unit 72 calculates an alcohol correction coefficient K1 for correcting the basic injection quantity calculated by the basic injection quantity calculation unit 70, based on the alcohol concentration Ca. An alcohol correction unit 74 multiplies the basic injection quantity by the alcohol correction coefficient K1, to correct the basic injection quantity.

A target air-fuel ratio setting unit 76 sets a target value (target air-fuel ratio) of the air-fuel ratio of the air-fuel mixture in the combustion chamber 24, in order that the exhaust characteristic becomes a predetermined characteristic. In detail, the target air-fuel ratio setting unit 76 sets a target output value VAF* of the output value VAF of the air-fuel ratio sensor 52. In more detail, the target air-fuel ratio setting unit 76 sets the target output value VAF* such that the target output value VAF* can vary depending on an operating point determined corresponding to the load and speed NE of the internal combustion engine 10. A deviation calculation unit 78 outputs the value resulting from subtracting the output value VAF from the target output value VAF*. Based on the output value of the deviation calculation unit 78, an air-fuel ratio feedback control unit 80 calculates a feedback correction coefficient K2, as a manipulated variable for the feedback control of the output value VAF to the target output value VAF*. A feedback correction unit 82 corrects the fuel quantity output by the alcohol correction unit 74, with the feedback correction coefficient K2.

The above alcohol correction coefficient K1 is a coefficient for setting an open-loop manipulated variable for controlling the air-fuel ratio in the combustion chamber 24 to the target air-fuel ratio, along with the basic injection quantity calculation unit 70. Here, the target air-fuel ratio, by which the exhaust characteristic is controlled to a predetermined characteristic, varies depending on the alcohol concentration Ca. Since the target air-fuel ratio varies depending on the alcohol concentration Ca, the alcohol correction coefficient K1 is an open-loop manipulated variable for controlling the output value VAF of the air-fuel ratio sensor 52 to the target output value VAF* regardless of the alcohol concentration Ca.

A command value Q* for the injection quantity that is the fuel quantity corrected by the above feedback correction unit 82 is output to an injection valve manipulation unit 84. The injection valve manipulation unit 84 divides the command value Q* for the injection quantity to the injection quantity for the port injection valve 16 and the injection quantity for the cylinder injection valve 28, sets injection periods TQ1, TQ2 for injecting the fuel by the divided injection quantities, and outputs the injection periods TQ1, TQ2 to the port injection valve 16 and the cylinder injection valve 28. In the embodiment, the fuel injection by the port injection valve 16 is executed in the whole of the operation range of the internal combustion engine 10. On the other hand, the fuel injection by the cylinder injection valve 28 is executed in the rapid catalyst warm-up and in a high-load operation range. Here, in the embodiment, the basic injection quantity calculation unit 70, the alcohol concentration correction unit 72, the alcohol correction unit 74, the target air-fuel ratio setting unit 76, the deviation calculation unit 78, the air-fuel ratio feedback control unit 80, the feedback correction unit 82 and the injection valve manipulation unit 84 constitute an air-fuel ratio control unit.

Figure 2:
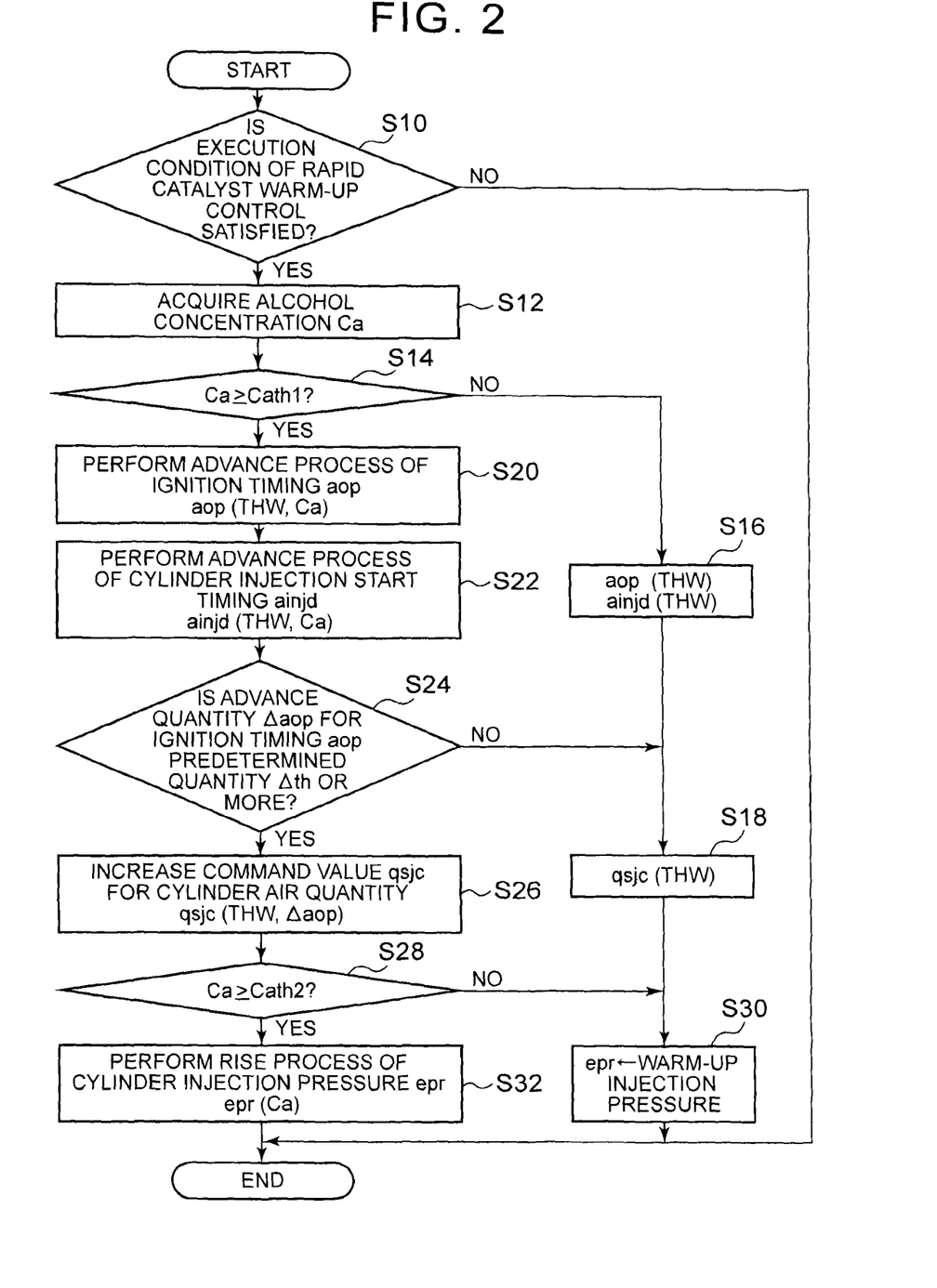
FIG. 2 is a flowchart showing a procedure of a rapid catalyst warm-up control according to the embodiment.

Hereinafter, the rapid catalyst warm-up control will be described in detail. FIG. 2 shows a procedure of the rapid catalyst warm-up control. The process is repeatedly executed, for example, in a predetermined cycle, by the control apparatus 60.

In a series of processes, the control apparatus 60, first, determines whether an execution condition of the rapid catalyst warm-up control is satisfied (S10). Here, the execution condition includes a first condition in which it is determined that the accelerator is released based on the accelerator manipulated variable ACCP, and a second condition that the water temperature THW is a predetermined temperature or less. Here, the predetermined temperature is set to a value for determining whether the catalyst 38 is not activated. Therefore, the second condition is a condition for determining that the catalyst 38 is not activated. It is preferable that the above execution condition include a condition that the start process of the internal combustion engine 10 is completed.

In the case of determining that the execution condition is satisfied (S10: YES), the control apparatus 60 acquires the alcohol concentration Ca (S12: acquisition processing unit). Subsequently, the control apparatus 60 determines whether the alcohol concentration Ca is a first specified concentration Cath1 or more (S14). The first specified concentration Cath1 is set to a value for determining whether the combustion of the fuel becomes unstable due to the increase in the alcohol concentration. Then, in the case of determining that the alcohol concentration Ca is less than the first specified concentration Cath1 (S14: NO), the control apparatus 60 sets the ignition timing aop and injection start timing ainjd of the fuel of the cylinder injection valve 28, depending on the water temperature THW, and executes the rapid catalyst warm-up control (S16). Here, the ignition timing aop is set to a retarded side, compared with the case where the rapid catalyst warm-up control is not executed at the time of the idle operation. This is a setting for reducing the ratio of the combustion energy of the air-fuel mixture that is converted into the torque of the crankshaft 32, and raising the exhaust gas temperature.

Next, the control apparatus 60 sets the command value qsjc for the air quantity, depending on the water temperature THW (S18). Here, the reason why the command value qsjc for the air quantity is set depending on the water temperature THW is that the air quantity necessary to control the speed NE to a predetermined speed varies depending on the water temperature THW. Incidentally, the above predetermined speed corresponds to the above target speed NE*. Depending on the command value qsjc set in this way, the opening angle θ of the throttle valve 14 is set, and therefore, the opening angle θ of the throttle valve 14 during the rapid catalyst warm-up control at the time of the idle operation can be regarded as an open-loop manipulated variable for controlling the speed NE to the target speed NE*.

In the case of determining that the alcohol concentration Ca is the first specified concentration Cath1 or more (S14: YES), the control apparatus 60 executes the catalyst warm-up control while inhibiting an unstable combustion that is caused by the alcohol concentration Ca.

That is, first, the control apparatus 60 advances the ignition timing aop depending on the alcohol concentration Ca (S20: ignition advance processing unit). Thereby, the ignition timing aop is set to an advanced side, compared with the case where the alcohol concentration Ca is less than the first specified concentration Cath1. The process inhibits an unstable combustion that is caused by a high alcohol concentration Ca. Here, the ignition timing aop set to an advanced side is also a value that depends on the water temperature THW, similarly to the case where the alcohol concentration Ca is less than the first specified concentration Cath1. Furthermore, in the case where the alcohol concentration Ca is the first specified concentration Cath1 or more, the ignition timing aop is set to a more advanced side as the alcohol concentration Ca is higher. Then, in the case where the alcohol concentration Ca is the first specified concentration Cath1 or more, the ignition timing aop has a one-to-one correspondence relation with the alcohol concentration Ca.

Further, the control apparatus 60 advances the injection start timing ainjd of the fuel of the cylinder injection valve 28, depending on the alcohol concentration Ca (S22: injection advance processing unit). Thereby, the injection start timing ainjd is set to an advanced side, compared with the alcohol concentration Ca is less than the first specified concentration Cath1. The process inhibits an unstable combustion by enhancing the stratification degree at the ignition timing aop. Here, the stratification degree means the concentrative distribution degree of the fuel around the spark plug 30. The injection start timing ainjd set to an advanced side is a value that depends on the water temperature THW, similarly to the case where the alcohol concentration Ca is less than the first specified concentration Cath1.

Next, the control apparatus 60 determines whether the advance quantity for the ignition timing aop is a predetermined quantity Δth or more (S24). Here, the predetermined quantity Δth is set to a value at which it is expected that the advance of the ignition timing aop remarkably degrades the warm-up performance for the catalyst. Then, in the case of determining that the advance quantity for the ignition timing aop is less than the predetermined quantity Δth (S24: NO), the control apparatus 60 transitions to the above step S18.

On the other hand, in the case of determining that the advance quantity for the ignition timing aop is the predetermined quantity Δth or more (S24: YES), the control apparatus 60 increases the command value qsjc for the cylinder air quantity, depending on the advance quantity Δaop of the ignition timing aop (S26: air quantity increase processing unit). That is, in the case where the advance quantity Δaop of the ignition timing aop is large, the command value qsjc for the cylinder air quantity is increased, compared with the case where the advance quantity Δaop of the ignition timing aop is small. Particularly, in the embodiment, the command value qsjc for the cylinder air quantity has a one-to-one correspondence relation with the advance quantity Δaop of the ignition timing aop.

The process inhibits the degradation in the warm-up performance for the catalyst 38 that is caused by the setting of the ignition timing aop to an advanced side in the process of step S20. That is, when the command value qsjc is increased, the basic injection quantity to be calculated by the basic injection quantity calculation unit 70 is increased for keeping the exhaust characteristic to a predetermined characteristic by the air-fuel ratio control. Furthermore, in the case where the exhaust characteristic cannot be controlled to a predetermined characteristic by the setting of the open-loop manipulated variable such as the basic injection quantity, the open-loop manipulated variable is corrected by the feedback correction coefficient K2, which is a manipulated variable for the feedback control of the output value VAF of the air-fuel ratio sensor 52 to the target output value VAF*. Therefore, in the case where the command value qsjc for the air quantity is increased, the command value Q* for the injection quantity is also increased. Thereby, the combustion energy increases, and the thermal energy in the exhaust gas increases. Accordingly, the thermal energy to be given to the catalyst 38 increases, compared with the case where the command value qsjc is not increased.

Further, the control apparatus 60 determines whether the alcohol concentration Ca is equal to or more than a second specified concentration Cath2 that is more than the first specified concentration Cath1 (S28). The process inhibits the deterioration in the emission and the combustion state that is caused by the increase in the quantity of the fuel to be injected from the cylinder injection valve 28 when the piston 22 is near the bottom dead center. That is, when the alcohol concentration Ca is high, the fuel injection quantity is increased for controlling the exhaust characteristic to a predetermined characteristic by the air-fuel ratio control. Then, when, as a result, the quantity of the fuel to be injected from the cylinder injection valve 28 excessively increases, the quantity of the fuel to be injected from the cylinder injection valve 28 when the piston 22 is near the bottom dead center increases. In the case where the quantity of the fuel to be injected from the cylinder injection valve 28 when the piston 22 is near the bottom dead center increases, the quantity of the fuel to adhere to a wall surface of the cylinder 20 increases. Then, in this case, there is a fear that the fuel is incompletely combusted and the emission and the combustion state are deteriorated.

In the case of determining that the alcohol concentration Ca is less than the second specified concentration Cath2 (S28: NO), the control apparatus 60 sets the injection pressure epr of the fuel to be injected from the cylinder injection valve 28, to a previously determined injection pressure (warm-up injection pressure) (S30). When the alcohol concentration Ca is the first specified concentration Cath1 or less, the warm-up injection pressure is an optimum value from the standpoint of combustion stability and the like.

On the other hand, in the case of determining that the alcohol concentration Ca is the second specified concentration Cath2 or more (S28: YES), the control apparatus 60 raises the injection pressure epr of the fuel to be injected from the cylinder injection valve 28, relative to the above warm-up injection pressure (S32: pressure rise processing unit). Here, as the alcohol concentration Ca is higher, the injection pressure epr is continuously raised relative to the warm-up injection pressure.

Here, in the case where the processes in steps S30, S32 are completed, or in the case where the negative determination is made in step S10, the control apparatus 60 ends the series of processes once. Here, an operation of the embodiment will be described with use of FIG. 3.

Figure 3:
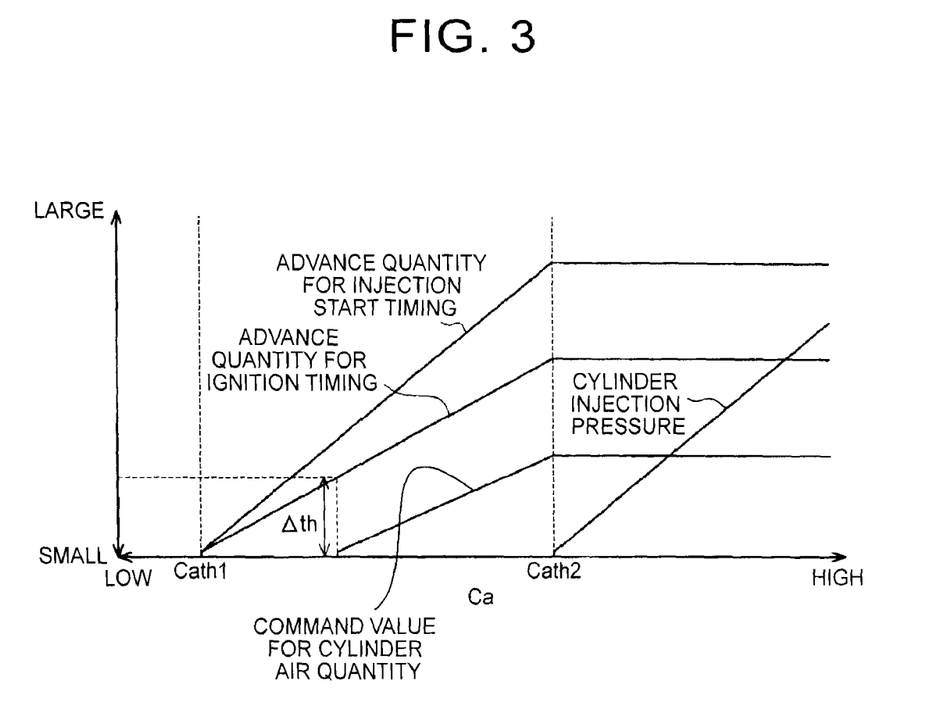
FIG. 3 is a diagram showing a relation between each manipulated variable for the above catalyst warm-up control and alcohol concentration.

In the case where the alcohol concentration Ca is the first specified concentration Cath1 or more, the injection start timing ainjd and the ignition timing aop are set to an advanced side. In detail, in the case where the alcohol concentration Ca is the first specified concentration Cath1 or more as described above, since there is a one-to-one correspondence relation between the ignition timing aop and the alcohol concentration Ca, the ignition timing aop is set continuously to a more advanced side as the alcohol concentration Ca is higher, as shown in FIG. 3. Particularly, in the case where the advance quantity for the ignition timing aop depending on the alcohol concentration Ca is the predetermined quantity Δth or more, the command value qsjc for the air quantity is increased. As described above, the command value qsjc for the air quantity and the advance quantity for the ignition timing aop has a one-to-one correspondence relation, and therefore, as the ignition timing aop is set to a more advanced side, the command value qsjc for the air quantity is continuously increased. Thereby, the fuel quantities to be injected from the port injection valve 16 and the cylinder injection valve 28 are also increased by the air-fuel ratio control, compared with the case where the command value qsjc is not increased. Therefore, the combustion energy of the fuel increases, and thereby, the thermal energy included in the exhaust gas increases. Thus, the increase in the command value qsjc and the like increases the flow volume of the exhaust gas that reaches the catalyst 38, and the increase in the energy in the exhaust gas increases the thermal energy that the catalyst 38 receives from the exhaust gas.

Further, in the case where the alcohol concentration Ca is the second specified concentration Cath2 or more, the injection pressure epr of the fuel of the cylinder injection valve 28 is set to a higher value, compared with the case where the alcohol concentration Ca is low. Here, even when the quantity of the fuel to be injected from the cylinder injection valve 28 is identical, in the case where the injection pressure epr is high, the injection period TQ2 is shortened relative to that in the case where the injection pressure epr is low. Therefore, by setting the injection pressure epr to a high value, it is possible to shorten the injection period TQ2, and therefore, it is possible to decrease the quantity of the fuel to be injected from the cylinder injection valve 28 when the piston 22 is near the bottom dead center.

In the case where the catalyst 38 is not activated, such processes are executed at least in a period after the start of the internal combustion engine 10 and before it is requested to give the shaft torque of the internal combustion engine 10 to the driving wheel of the vehicle by the pressing of the accelerator pedal 55. In other words, the processes are executed at the time of the idle operation of the internal combustion engine 10. By performing the rapid warm-up of the catalyst 38 in the period, it is possible to put the catalyst 38 into an activated state, before the shaft torque of the internal combustion engine 10 is given to the driving wheel by the pressing of the accelerator pedal 55 and the vehicle starts to move.

According to the embodiment described above, the following effects are obtained. (1) The control apparatus 60 sets the ignition timing aop to an advanced side in the case where the alcohol concentration Ca is high (S20), and increases the command value qsjc for the air quantity in the case where the advance quantity for the ignition timing aop is large (S26). Thereby, it is possible to achieve a good compatibility between the combustion stability and the warm-up performance for the catalyst 38.

(2) The control apparatus 60 sets the injection start timing ainjd of the fuel of the cylinder injection valve 28 to an advanced side in the case where the alcohol concentration Ca is high (S22). Thereby, it is possible to inhibit the reduction in the stratification degree near the spark plug 30 at the ignition timing aop, even when the injection period of the fuel of the cylinder injection valve 28 is extended because of a high alcohol concentration Ca.

(3) In the case where the alcohol concentration is the predetermined value (the second specified concentration Cath2) or more, the control apparatus 60 raises the injection pressure epr of the fuel to be injected from the cylinder injection valve 28 (S32). Thereby, it is possible to inhibit the deterioration in the emission and the combustion state.

(4) The control apparatus 60 sets the ignition timing aop continuously to an advanced side, as the alcohol concentration Ca is higher. Thereby, it is possible to set the ignition timing aop to a more proper value, compared with a configuration in which the ignition timing aop is advanced only in one step.

(5) The control apparatus 60 continuously increases the command value qsjc for the air quantity, as the ignition timing aop is set to a more advanced side. Thereby, it is possible to set the air quantity to a more proper quantity, compared with a configuration in which the command value qsjc for the air quantity is increased only in one step.

(6) The control apparatus 60 executes the rapid warm-up control of the catalyst 38, with the condition that the shaft torque of the internal combustion engine 10 requested to be given to the driving wheel is zero. Thereby, during the rapid warm-up control, the internal combustion engine 10 does not generate the shaft output in response to the manipulation of the accelerator pedal 55 that is mounted in the vehicle. Thereby, the execution of the process of the increase in the command value qsjc for the air quantity, and the like is not restricted by the manipulation of the accelerator pedal 55.

OTHER EMBODIMENTS

Here, the above embodiment may be modified and carried out as follows. Hereinafter, in some parts, the correspondence relation between the matter described in "SUMMARY OF THE INVENTION" and the above embodiment is exemplified by reference characters and the like, but it is not intended that the above matter is limited to the exemplified correspondence relation.

[Air Quantity Increase Processing Unit (S26)]

In the above embodiment, the command value qsjc for the cylinder air quantity is increased, and in response to this, the opening angle θ of the throttle valve 14 is set for the open-loop control of the air quantity, but the invention is not limited to this. For example, a calculation unit to calculate the quantity of the air that is filled into the combustion chamber 24 based on a detection value of the intake flow volume in the intake passage 12, a detection value of the cylinder pressure or the like may be included, the calculation value by the calculation unit may be adopted as a feedback controlled variable, and with this, the feedback control may be performed to the command value qsjc.

In the above embodiment, during the rapid catalyst warm-up, the feedback control of the speed NE is not performed, but this may be performed. In this case, for example, the target speed NE* may be set depending on the command value qsjc for the cylinder air quantity. Further, without using the command value qsjc for the cylinder air quantity as an intermediate variable, the target speed NE* may be set to a higher value as the alcohol concentration Ca is higher. Even in this case, it is possible to increase the cylinder air quantity in the case where the alcohol concentration Ca is high, compared with the case where the alcohol concentration Ca is low. Further, a calculation unit to calculate the quantity of the air that is filled into the combustion chamber 24 based on a detection value of the intake flow volume in the intake passage 12, a detection value of the cylinder pressure or the like may be included, and a manipulated variable for the feedback control of the command value qsjc with the calculation value by the calculation unit may be adopted as the target speed NE*.

In the above embodiment, the command value qsjc for the cylinder air quantity is increased with the condition that the alcohol concentration Ca is the first specified concentration Cath1 or more, but the invention is not limited to this. For example, the command value qsjc for the cylinder air quantity may be continuously increased, when the alcohol concentration Ca is higher than zero.

In the above embodiment, the cylinder air quantity (the command value qsjc) is continuously increased as the advance quantity for the ignition timing aop is larger, but the invention is not limited to this. For example, the cylinder air quantity may be increased stepwise in two or more steps. Further, the invention is not limited to this, and the cylinder air quantity may be increased in one step, depending on the advance quantity. For example, this can be actualized by adopting, as the command value qsjc, a first value or a second value that is smaller than the first value, depending on whether the advance quantity is a previously determined value or more.

The parameter to be used for the increase in the command value qsjc for the air quantity is not limited to the advance quantity Δaop, and for example, may be the alcohol concentration Ca. In the above embodiment, the drive of auxiliary machines by the shaft torque of the internal combustion engine 10 at the time of the idle operation has not been particularly mentioned. However, actually, for example, a configuration in which a driven shaft of a compressor of an air-conditioning apparatus is mechanically linked to the crankshaft 32 is possible. Then, on this occasion, in the case where the compressor is driven, the command value qsjc for the cylinder air quantity may be increased, compared with the case where the compressor is not driven. On this occasion, it is possible that the quantity of the increase in the command value qsjc in the case where the advance quantity for the ignition timing aop is large compared with the case where the advance quantity for the ignition timing aop is small is reduced at the time of the drive of the compressor.

[Ignition Advance Processing Unit (S20)]

In the above embodiment, the ignition timing aop is advanced with the condition that the alcohol concentration Ca is the first specified concentration Cath1 or more, but the invention is not limited to this. For example, the ignition timing aop may be continuously advanced, when the alcohol concentration Ca is higher than zero.

Further, the invention is not limited to the configuration in which the ignition timing aop is continuously advanced as the alcohol concentration Ca is higher. For example, the ignition timing aop may be advanced stepwise in two or more steps. Further, the invention is not limited to this, and for example, the ignition timing may be advanced in one step, depending on the alcohol concentration Ca. For example, this can be actualized by adopting, as the ignition timing aop, a first timing or a second timing that is on a more retarded side than the first timing, depending on whether the alcohol concentration Ca is a previously determined value or more.

[Injection Advance Processing Unit (S22)]

In the above embodiment, the ignition start timing ainjd is advanced with the condition that the alcohol concentration Ca is the first specified concentration Cath1 or more, but the invention is not limited to this. For example, the injection start timing ainjd may be continuously advanced, when the alcohol concentration Ca is higher than zero.

Further, the invention is not limited to the configuration in which the injection start timing ainjd is continuously advanced as the alcohol concentration Ca is higher. For example, the injection start timing ainjd may be advanced stepwise in two or more steps. Further, the invention is not limited to this, and for example, the injection start timing ainjd may be advanced in one step, depending on the alcohol concentration Ca. For example, this can be actualized by adopting, as the injection start timing ainjd, a first timing or a second timing that is on a more retarded side than the first timing, depending on whether the alcohol concentration Ca is a previously determined value or more.

[Air-Fuel Ratio Control Unit (70 to 84)]

In the above embodiment, both of the quantity of the fuel to be injected from the cylinder injection valve 28 and the quantity of the fuel to be injected from the port injection valve 16 are adopted as the fuel quantity that is the manipulated variable for the air-fuel ratio control, but the invention is not limited to this. For example, only the quantity of the fuel to be injected from the cylinder injection valve 28 may be adopted, or only the quantity of the fuel to be injected from the port injection valve 16 may be adopted. In the case of only the quantity of the fuel to be injected from the port injection valve 16, it is possible to adopt a fixed value as the quantity of the fuel to be injected from the cylinder injection valve 28 regardless of the alcohol concentration Ca, and therefore, it is possible to omit the process (step S32 in FIG. 2) of raising the injection pressure of the cylinder injection valve 28, without deteriorating the emission and the combustion state.

In the above embodiment, the open-loop control (72, 74) and the feedback control (76 to 82) are concurrently used as the air-fuel ratio control for controlling the exhaust characteristic to a predetermined characteristic. However, the invention is not limited to this, and either one may be used. Here, in the case of performing only the open-loop control, it is only necessary to set the open-loop manipulated variable (the alcohol correction coefficient K1) such that the exhaust characteristic is an exhaust characteristic that is actualized by the feedback control when the target output value VAF* for the air-fuel ratio feedback control is constant regardless of the alcohol concentration Ca.

Furthermore, the air-fuel ratio control is not limited to the control for the exhaust characteristic that is actualized by the feedback control when the target output value VAF* for the air-fuel ratio feedback control is constant regardless of the alcohol concentration Ca.

[Pressure Rise Processing Unit (S32)]

In the above embodiment, the injection pressure epr is raised with the condition that the alcohol concentration Ca is the second specified concentration Cath2 or more, but the invention is not limited to this. For example, the injection pressure epr may be raised continuously or stepwise in two or more steps, when the alcohol concentration Ca is higher than zero.

[Acquisition Processing Unit (S12)]

The invention is not limited to the configuration in which the detection value of the alcohol concentration sensor 54 is acquired. For example, an air-fuel ratio feedback controller may be configured to include an integration element, and the manipulated variable for the air-fuel ratio feedback control may be acquired as the alcohol concentration. Here, if the manipulated variable and the injection quantity have a positive correlation, the alcohol concentration is increased as the manipulated variable is larger. Here, it is preferable that a steady-state value of the output value of the integration element be used as the above manipulated variable for getting the alcohol concentration. Further, for example, for the feedback control of the injection pressure of the cylinder injection valve 28, a controller to perform the feedback control of the discharge quantity of the high-pressure fuel pump 42 may be configured to include an integration element, and the manipulated variable for the feedback control may be acquired as the alcohol concentration.

[Warm-Up Control Unit (S10 to S32)]

In the above embodiment, the rapid catalyst warm-up control is executed with the condition that the internal combustion engine 10 is in the idle operation, but the invention is not limited to this. For example, in the case where the dynamic power requested for the driving wheel in response to the accelerator manipulation can be divided to the shaft output of the internal combustion engine 10 and the output of a motor, for example, in the case of a series/parallel hybrid vehicle, a parallel hybrid vehicle or the like, the rapid catalyst warm-up control can be performed in a period during which the shaft output of the internal combustion engine 10 is given to the driving wheel. That is, for example, in the case where the internal combustion engine 10 is started when the vehicle is running and where the increase in the command value qsjc for the cylinder air quantity, because of a high alcohol concentration Ca, increases the shaft output of the internal combustion engine 10 compared with when the command value qsjc for the cylinder air quantity is not increased, some of the shaft output may be used as some of the dynamic power requested for the driving wheel.

[Fuel Injection Valve]

The invention may include only the cylinder injection valve 28 without including the port injection valve 16. Further, the invention may include only the port injection valve 16 without including the cylinder injection valve 28. In short, if, in the case where the alcohol concentration Ca is high, the ignition timing is advanced compared with the case where the alcohol concentration Ca is low, it is effective to increase the command value qsjc for the air quantity, for inhibiting the degradation in the warm-up performance for the catalyst 38 that is caused by the advance of the ignition timing.

[Actuator for Increasing Quantity of Air to be Filled into Cylinder]

The actuator is not limited to the throttle valve 14. For example, in the case of a configuration of including a variable mechanism that can vary the valve characteristic of an engine valve (an intake valve or an exhaust valve) such as valve timing and valve lift, it is sometimes possible to increase the quantity of the air to be filled into the cylinder by altering the valve characteristic, and in this case, the valve characteristic may be manipulated.

[Principle of Compensation for Reduction in Exhaust Gas Temperature by Ignition Timing Advance in Rapid Catalyst Warm-Up Control]

In the above embodiment, even during the rapid catalyst warm-up, the exhaust characteristic is controlled to a predetermined characteristic by the air-fuel ratio control, and therefore, the increase in the cylinder air quantity in association with the ignition timing advance means the increase in the fuel injection quantity by the air-fuel ratio control. However, the invention is not limited to this. For example, it is possible that, although the exhaust characteristic is not controlled to a predetermined characteristic, the fuel is increased in some degree for increasing the thermal energy of the exhaust gas while increasing the cylinder air quantity.

Furthermore, the injection quantity in the case where the cylinder air quantity is increased may be the same as that in the case where the cylinder air quantity is not increased. Even in this case, the exhaust gas temperature rises, for example, because the air-fuel ratio becomes lean due to the increase in the cylinder air quantity or because the thermal energy to be generated in the air-fuel mixture by adiabatic compression increases compared with the case where the cylinder air quantity is not increased. Further, in the case where the quantity of the exhaust gas having the exhaust gas temperature raised increases, it is possible to inhibit the degradation in the warm-up performance for the catalyst 38.

[Others]

The execution condition for the rapid catalyst warm-up control is not limited to the condition exemplified in the above embodiment. For example, in a configuration of including an oxygen sensor downstream of the catalyst 38, whether the catalyst 38 is not activated may be determined based on the output value of the oxygen sensor, instead of the condition of the water temperature THW.

In FIG. 2, whether the alcohol concentration Ca is the first specified concentration Cath1 or more is determined, but the invention is not limited to this. For example, the ignition timing aop and the injection start timing ainjd may be decided from a two-dimensional map of the water temperature THW and the alcohol concentration Ca, and then, the above determination process may be omitted. Similarly, the command value qsjc for the air quantity may be decided from a two-dimensional map of the water temperature THW and the advance quantity Δaop, and then, the above determination process may be omitted. Further, the injection pressure epr may be calculated from a table of the alcohol concentration Ca, and then, the determination of whether the alcohol concentration Ca is the first specified concentration Cath1 or more may be omitted.

What is claimed is:

1. A control apparatus for a spark-ignition internal combustion engine, the spark-ignition internal combustion engine including:
a fuel injection valve that injects fuel, the fuel being fed into a cylinder;
a catalyst that is provided in an exhaust passage; and
a spark plug,
the control apparatus comprising an electronic control unit configured to:
a) acquire alcohol concentration of the fuel that is injected from the fuel injection valve;
b) execute a warm-up control of the catalyst by controlling ignition timing of the spark plug, when the catalyst is not activated; and
c) during the execution of the warm-up control,
   i) in a case where the alcohol concentration is higher than a first specified concentration set the ignition timing to an advanced side, compared with a case where the alcohol concentration is lower than the first specified concentration, and
   ii) in a case where quantity of advance of the ignition timing is larger than a predetermined quantity, increase quantity of air that is filled into the cylinder, compared with a case where the quantity of the advance of the ignition timing is smaller than the predetermined quantity,
wherein the electronic control unit is configured to:
set the ignition timing to a more advanced side continuously or stepwise in two or more steps, as the alcohol concentration is higher than the first specified concentration; and
increase the quantity of the air continuously or stepwise in two or more steps, as the ignition timing is set to the more advanced side.

2. The control apparatus according to claim 1, wherein the electronic control unit is configured to control quantity of the fuel that is injected from the fuel injection valve, during the execution of the warm-up control, in order to control air-fuel ratio of air-fuel mixture in the cylinder to a target air-fuel ratio.

3. The control apparatus according to claim 2, wherein the fuel injection valve is a cylinder injection valve that directly injects the fuel into the cylinder, and
the electronic control unit is configured to:
   i) control the quantity of the fuel that is injected from the cylinder injection valve, in order to control the air-fuel ratio of the air-fuel mixture to the target air-fuel ratio; and
   ii) in the case where the alcohol concentration is high, advance injection start timing of the fuel of the cylinder injection valve, compared with the case where the alcohol concentration is low.

4. The control apparatus according to claim 2, wherein the fuel injection valve is a cylinder injection valve that directly injects the fuel into the cylinder, and
the electronic control unit is configured to:
   i) control the quantity of the fuel that is injected from the cylinder injection valve, in order to control the air-fuel ratio of the air-fuel mixture to the target air-fuel ratio; and
   ii) raise pressure of the fuel that is injected from the cylinder injection valve, in a case where the alcohol concentration is equal to or larger than a predetermined value.

5. The control apparatus according to claim 1, wherein the spark-ignition internal combustion engine is mounted in a vehicle, and gives shaft torque to a driving wheel, and
the electronic control unit is configured to execute the warm-up control of the catalyst at time of idle operation of the spark-ignition internal combustion engine.

* * * * *